United States Patent
Park et al.

(10) Patent No.: US 9,094,128 B2
(45) Date of Patent: Jul. 28, 2015

(54) SCHEME FOR REMOTE CONTROL OF THE OUTPUT POWER OF A TRANSMITTER IN A SMART SFP TRANSCEIVER

(75) Inventors: Kwang Soo Park, Tinton Falls, NJ (US); Moon Soo Park, Gwangju (KR); Christian Hoede, Dieman (NL); Jan A. W. Venema, Amersfoort (NL)

(73) Assignee: Optoelectronics Solutions Co., Ltd., Gwangju (KR)

( * ) Notice: Subject to any disclaimer, the term of this patent is extended or adjusted under 35 U.S.C. 154(b) by 751 days.

(21) Appl. No.: 13/208,301

(22) Filed: Aug. 11, 2011

(65) Prior Publication Data
US 2013/0039654 A1    Feb. 14, 2013

(51) Int. Cl.
*H04B 10/40*    (2013.01)
(52) U.S. Cl.
CPC ..................... *H04B 10/40* (2013.01)
(58) Field of Classification Search
CPC ............... H04B 10/695; H04B 10/40
USPC ................................. 398/135, 137
See application file for complete search history.

(56) References Cited

U.S. PATENT DOCUMENTS

2009/0269053 A1* 10/2009 Yang ............................. 398/22
2009/0269076 A1* 10/2009 Cai et al. ....................... 398/135

OTHER PUBLICATIONS

OE Solutions demonstrates 10GbE single-wavelength bi-directional XFP; Lightwave, Mar. 4, 2011 [online], [retrieved on Dec. 7, 2013]. Retrieved from the Internet <URL: http://www.lightwaveonline.com/articles/2011/03/oe-solutions-demonstrates-10gbe-single-wavelength-bi-directional-xfp-117399913.html.*
Non-Final Office Action dated Dec. 12, 2013 from U.S. Appl. No. 13/208,299.
Wikipedia, "Proprietary protocol," http://web.archive.org/web/20090730020423/http://en.wikipedia.org/wiki/Proprietary_protocol, prior to Jul. 30, 2009; 2 pages.

* cited by examiner

*Primary Examiner* — Nathan Curs
(74) *Attorney, Agent, or Firm* — Blakely, Sokoloff, Taylor & Zafman LLP

(57) ABSTRACT

A scheme is described for remote control of the output power of a transmitter in a smart SFP (or SFP+, or XFP) duplex (or BiDi, or SWBiDi) transceiver in a communication system using an operating system with OAM and PP functions, an OAM, PP & Payload Processor, a transceiver, an optical power meter (optional), a BERT, and an optical link in the field.

23 Claims, 3 Drawing Sheets

US 9,094,128 B2

SCHEME FOR REMOTE CONTROL OF THE OUTPUT POWER OF A TRANSMITTER IN A SMART SFP TRANSCEIVER

FIELD

Embodiments of the invention relate to a scheme for remote control of an electro-optical parameter of a smart transceiver in an optical fiber communication system, and more particularly, to a scheme for remote control of the output power of a transmitter in the smart transceiver. The applications of embodiments of the present invention include a smart transceiver installed in communication systems without optical amplifiers as well as optically amplified wavelength division multiplexing (WDM) communication systems, for example, such as long-haul transmission networks, access networks of fiber to the x (FTTx), passive optical network (PON) networks, and wireless backhauls between a base station and an antenna tower or a remote radio head (RRH), but not limited only to these systems. A smart transceiver is an intelligent transceiver which can execute Ethernet in the First Mile Operation, Administration, and Maintenance (EFM OAM) functions specified in IEEE 802.3ah, including an electrical loopback configuration and the proprietary protocol (PP) functions. The type of the smart transceiver includes a smart small form-factor pluggable (SFP) transceiver, a smart small form-factor pluggable plus (SFP+) transceiver, and a smart 10 gigabit small form-factor pluggable (XFP) transceiver, and a Duplex smart transceiver as well as a bidirectional (BiDi) smart transceiver and a single wavelength bidirectional (SWBiDi) smart transceiver.

BACKGROUND

Setting the output power of a transmitter in a transceiver at an optimum level is very desirable because it (1) helps to avoid the overloading of a receiver, (2) provides the link optimization of an optically amplified WDM communication system, and (3) reduces power consumption. The optimum output power of the transmitter depends solely on each system in which the transceiver is operating. Here all the communication systems are grouped as follows: (1) communication systems without optical amplifiers, and (2) optically amplified WDM communication systems.

For the communication systems without optical amplifiers, it is not rare that a service provider encounters occasions of deploying a transceiver whose transmitter output power set by the transceiver supplier might overload the receiver at the other end of the communication system when the link loss is much smaller, for example, a very short span of the fiber link, than the typical link budget of the transceiver. To avoid the overloading, an optical attenuator of fixed attenuation is frequently inserted just before the receiver, which is an extra expenditure.

On the other hand, when the link loss of the communication system is a little bit bigger than expected, the service provider sometimes needs to increase slightly the output power of the transmitter, for example, by around 1 dB while the increase is within the limit of the specification of the transmitter.

For the optically amplified WDM communication systems, it is a common practice to execute the optimization of the link composed of multiple transceivers running at different wavelengths, optical multiplexes (MUX's), optical amplifiers, link fibers, and optical demultiplexers (DEMUX's), through tuning of an individual channel transceiver. Particularly, the output power of the transmitter of each transceiver is optimized/ equalized such that one channel, for example, would not predominantly determine the overall performance of the link with optical amplifiers.

For the reduction of power consumption, setting the output power of the transmitter at the optimum rather than at the higher output power typically set at the factory of the transceiver supplier will reduce significantly the power consumption of a communication system where many transceivers are used through the accumulation in saving of small amount of power consumption of each transceiver; this will also reduce the power consumption in cooling the communication system at the central office (CO) of the service provider which effectively saves the capital expenditure (CAPEX) and operating expenditure (OPEX) of the service provider; this will also prolong the life span of this communication system, particularly the transmitter of the transceiver.

A transceiver will, in general, be benefited when it is equipped with the adjustability of the output power of a transmitter in the transceiver as described above. Because (1) a communication system consists of, at least, two transceivers where the transmitter of one transceiver is transmitting a signal to the receiver of another transceiver, and (2) the optimum output power of the transmitter depends solely on each system in which the transceiver is operating, the controllability of the output power of the transmitter in one transceiver by another transceiver will be a desirable feature. This is particularly true if two transceivers are physically separated far away from each other. In other words, a remote controllability of the output power of the transmitter of one transceiver by another transceiver will be very valuable, considering the facts that (1) the adjustment of its output power can be executed by the technician at the CO where all the necessary test equipments are accessible easily and (2) another technician does not have to be present simultaneously at the site of the transceiver which is in need of adjustment of its output power; this will save a lot of capital and operating expenditures (CAPEX and OPEX) by the service provider/operator.

SUMMARY

According to embodiments of the present invention, a scheme of remote control of an output power of a transmitter in a smart transceiver may comprise a smart transceiver at a first end of the optical link, the optical link, a transceiver, an OAM, PP & Payload processor, an operating system with the OAM and the PP functions, an optical power meter at a second end of the optical link (optional), and a Bit Error Rate Tester (BERT). A PP similar to OAM protocol data unit (OAMPDU) of EFM OAM is a message protocol of changing or monitoring the output power of the transmitter in the smart transceiver.

According to embodiments of the present invention, a smart transceiver at a first end of the optical link can perform the EFM OAM and the PP functions in passive mode including the electrical loopback and the PP functions. The smart transceiver is equipped with (1) a circuitry which can adjust the output power of the transmitter and (2) a circuitry which can measure the Tx output power or the Tx bias current of the transmitter in the smart transceiver upon receiving a commanding message in a PP from the transceiver at a second end of the optical link. The type of the smart transceiver may be SFP, or SFP+, or XFP, and Duplex, or BiDi, or SWBiDi.

According to embodiments of the present invention, an optical link may comprise an optical MUX, optical amplifier(s), optical fiber(s), and an optical DEMUX.

According to embodiments of the present invention, a transceiver at a second end of the optical link can perform the EFM OAM and the PP in active mode. This transceiver can send out a commanding message of the adjustment or measurement of the output power of the transmitter in the smart transceiver in a first end of the optical link using a PP.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Figure 1:
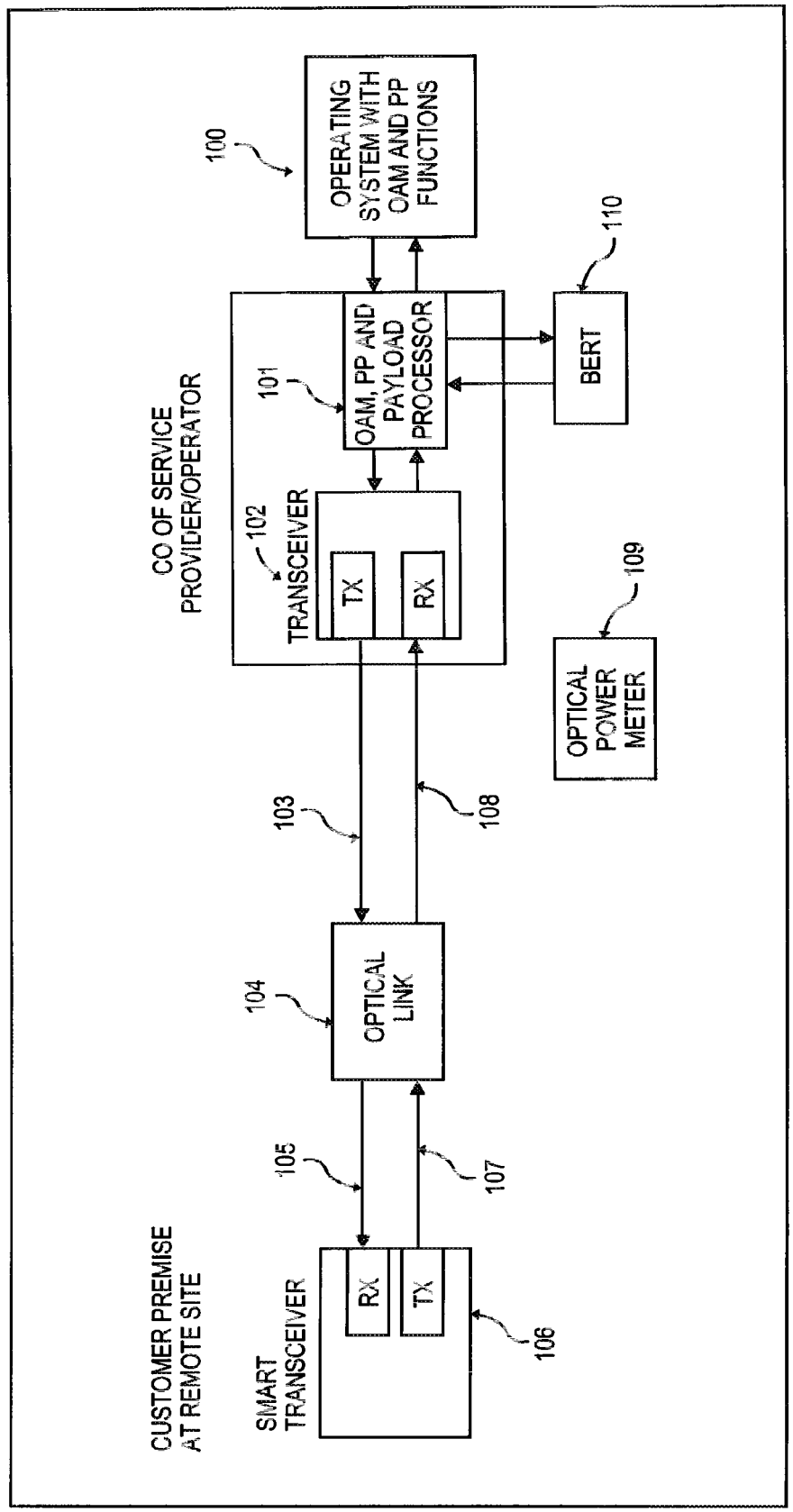
FIG. 1 shows a configuration for a scheme of remote control of the output power of a transmitter in a smart duplex transceiver.

As shown in FIG. 1, a scheme of remote control of the output power of a transmitter in a smart transceiver includes an operating system with OAM and PP functions 100, an OAM, PP & Payload Processor 101, a duplex transceiver 102, a pair of optical fiber jumpers 103 and 108, an optical link 104, a pair of optical fiber jumpers 105 and 107, and a smart duplex transceiver 106, an optical power meter 109 (optional) and a BERT 110.

Figure 2:
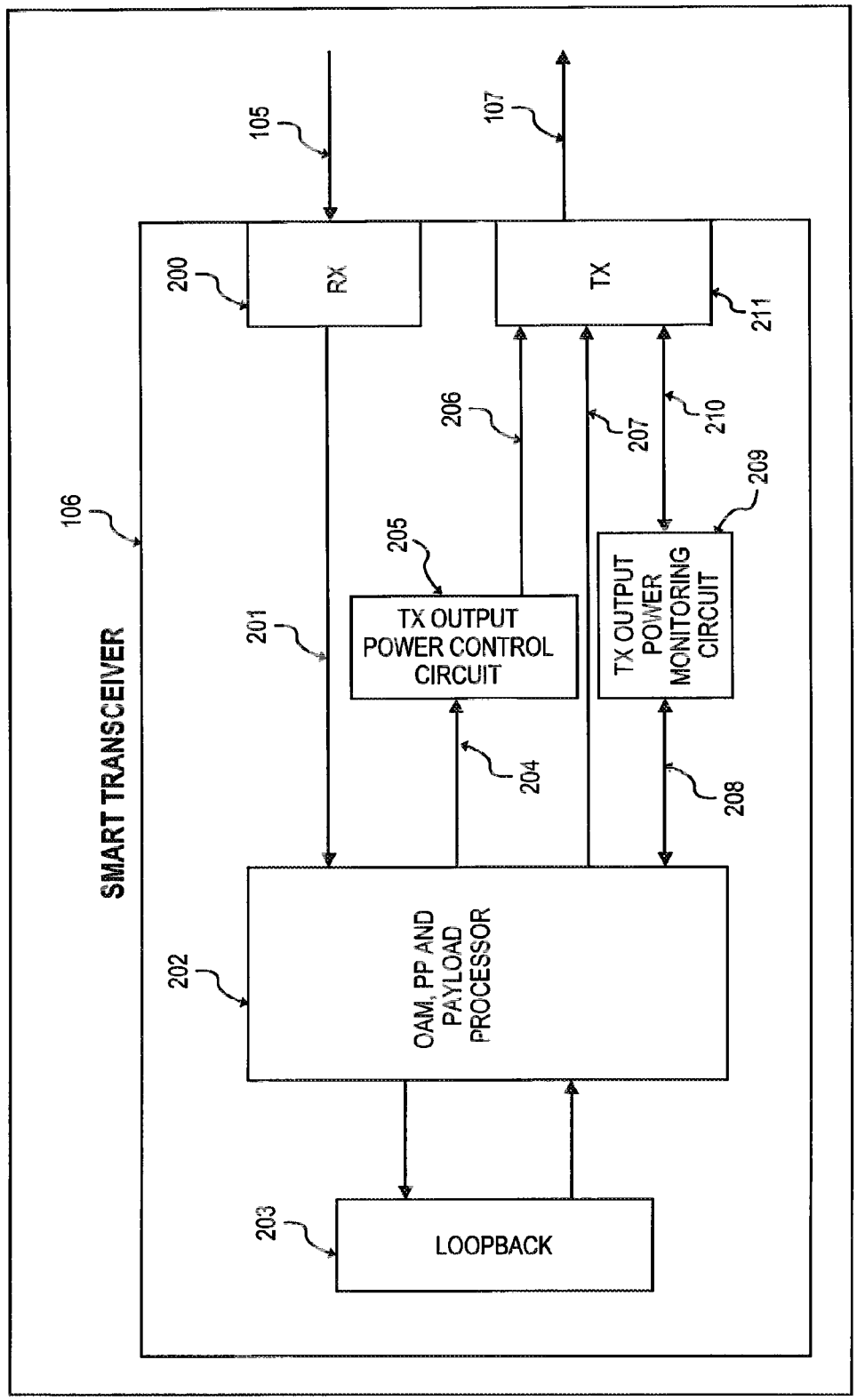
FIG. 2 shows a detail functional block diagram of a smart duplex transceiver.

As shown in FIG. 2, a smart duplex transceiver includes an optical receiver 200, an electrical path 201, an OAM, PP & Payload Processor 202, a Loopback circuit 203, an electrical path 204, a Tx output power control circuit 205, electrical paths 206, 207, and 208, a Tx output power monitoring circuit 209, an electrical path 210, and an optical transmitter 211.

Figure 3:
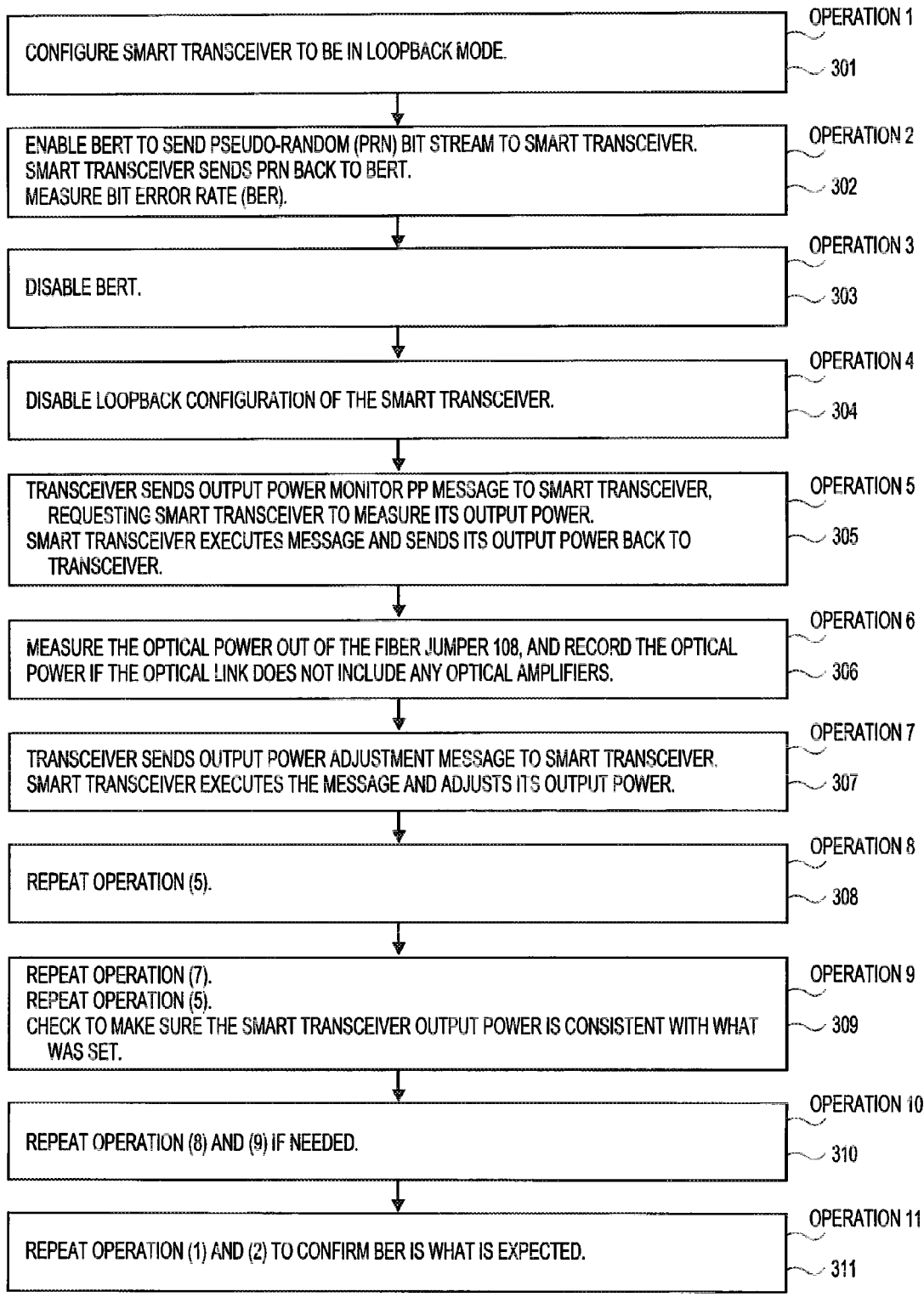
FIG. 3 shows a procedure for the remote control of the output power of a transmitter in a smart duplex transceiver.

The following is a procedure, shown in FIG. 3, for the remote control of the output power of a transmitter in a smart duplex transceiver 106.

It is assumed, but not required, during this procedure that the transmission is error free in either direction, from the transceiver 102 to the smart transceiver 106, or from the smart transceiver 106 to the transceiver 102, because the PP messages of controlling the transmitter output power are to be exchanged between transceivers 102 and 106. This is typically met since almost all the systems in service are designed to run in error free region with even an extra system margin of few dB.

Sometimes, a variable optical attenuator might be needed between the output of the transmitter in the transceiver 102 and the optical jumper 103, as well as between the optical jumper 108 and the input of the receiver in the transceiver 102, if the total link loss is very small and the overloading of receivers of two transceivers 102 and 106 is expected.

Sometimes, the transmission with default settings of the communication system over the optical link 104 might not be error free. In this case, all the PP messages might need to be sent repeatedly to make sure that the PP messages are received correctly by the transceiver at the receiving side.

Operation One

The following is the first operation 301. Therefore, it is necessary, first of all, to configure the smart duplex transceiver 106 in a loopback mode to find the BER with the current settings of the transceiver. For this, a loopback OAM Protocol Data Unit (OAMPDU) generated at the operating system with OAM and PP functions 100 is sent to an OAM, PP & Payload Processor 101 where the loopback OAMPDU is encapsulated serially with the payload, if there is any.

During this period, disable the output from the BERT 110. The output is sent to the transceiver 102 where the electrical signal of the loopback OAMPDU message is converted into an optical signal. Then the optical signal of the loopback message is transmitted through the optical jumper 103, the optical link 104, an optical jumper 105, and arrives at the smart diplex transceiver 106.

The optical signal arrived at the smart duplex transceiver 109 is then converted into an electrical signal at the receiver 200. The electrical signal is transmitted through the electrical path 201, and arrives at an OAM, PP & Payload Processor 202 where the loopback OAMPDU message is separated and executed. Now only the remaining payload, if there is any, passes through the OAM, PP & Payload Processor 202, an electrical path 207, and arrives at the optical transmitter 210 where the electrical payload signal is converted into an optical signal.

The optical signal of the payload from the smart transceiver 106 is transmitted through an optical jumper 107, the optical link 104, an optical jumper 108, and arrives at the transceiver 102 where the optical signal is converted into an electrical signal. The electrical signal transmits to the OAM, PP & Payload Processor 101. This completes the configuration in the loopback mode.

Operation Two

The following is the second operation 302. Enable the output from the BERT 110 and a pseudo-random bit stream is sent out at the same data rate of the communication system to the OAM, PP & Payload Processor 101. During this transmission period, do not send out any OAMPDU's and PP's in the data stream. This pseudo-random data signal will be transmitted through the path described above during the preparation of the loopback mode and then will return to the error detector of the BERT for the BER measurement. Record the measured BER.

Operation Three

The following is the third operation 303. Disable the output of the BERT 110.

Operation Four

The following is the fourth operation 304. Disable the loopback configuration of the smart transceiver 106 using the operation (1) above with a disable loopback OAM Protocol Data Unit (OAMPDU).

Operation Five

The following is the fifth operation 305. Send an output power monitor PP message generated at the operating system with OAM and PP functions 100 to the OAM, PP & Payload Processor 101. The output is sent to the transceiver 102 where the electrical signal of the output power monitor PP message is converted into an optical signal. Then the optical signal of the output power monitor PP message is transmitted through the optical jumper 103, the optical link 104, an optical jumper 105, and arrives at the smart duplex transceiver 106. This PP message is for requesting the output power monitoring circuit 209 to measure the Tx output power or the Tx bias current and then sending it to the transceiver 102 in another PP message generated in the transceiver 106.

The optical signal arrived at the smart duplex transceiver 106 is then converted into an electrical signal at the receiver 200. The electrical signal is transmitted through the electrical path 201, and arrives at the OAM, PP & Payload Processor 202 where the output power monitor PP message is separated. An execution message of the output power monitor PP message is sent to the Tx output power monitor circuit 209 which measures the output power of the transmitter 211 accordingly. The measured Tx output power or the measured Tx bias current is processed in the OAM, PP & Payload Processor 202 and sent along the electrical path 207 to the transmitter 211 with the payload where it is converted into an optical signal.

The optical signal is transmitted through the optical jumper 107, the optical link 104, and the optical jumper 107, and arrives at the receiver of the transceiver 102 where the optical signal is converted back into an electrical signal. This signal is processed at the OAM, PP & Processor 101, and the measured Tx output power or the measured Tx bias current is read out at the Operating System w/OAM and PP Functions 100. Record the Tx output power or the Tx bias current.

Operation Six

The following is the sixth operation 306. Measure the optical power out of the fiber jumper 108 using the Optical Power Meter 109 and record the optical power if the optical link 104 does not include any optical amplifiers.

Operation Seven

The following is the seventh operation 307. Send an output power adjustment PP message, a message that sets the Tx output power at a specified value, generated at the operating system with OAM and PP functions 100 to the OAM, PP & Payload Processor 101. The output is sent to the transceiver 102 where the electrical signal of the output power adjustment PP message is converted into an optical signal. Then the optical signal of the output power adjustment PP message is transmitted through the optical jumper 103, the optical link 104, an optical jumper 105, and arrives at the smart diplex transceiver 106.

The optical signal arrived at the smart duplex transceiver 106 is then converted into an electrical signal at the receiver 200. The electrical signal is transmitted through the electrical path 201, and arrives at an OAM, PP & Payload Processor 202 where the output power adjustment PP message is separated. An execution message of the output power adjustment is sent to the Tx output power control circuit 205 which adjusts the output power of the transmitter 211 accordingly.

Operation Eight

The following is the eighth operation 308. Repeat operation (5) to read out the Tx output power or the Tx bias current at the new setting. Record this.

Operation Nine

The following is the ninth operation 309. Repeat operation (7). Repeat operation (5) and record the Tx output power. Check that the Tx output power is consistent with what was set or expected.

Operation Ten

The following is the tenth operation 310. Repeat operation (8) and operation (9) if needed.

Operation Eleven

The following is the eleventh operation 311. Repeat operation (1) and operation (2). Confirm if the measured BER is indeed what is expected.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for optimizing a communication system comprising:
remote control of output power of a transmitter in a first transceiver in a communication system, said communication system comprising an operating system with Operation, Administration, and Maintenance (OAM) and Protocol (PP) functions, an OAM, PP & Payload Processor, a second transceiver, a Bit Error Rate Test (BERT) equipment, and an optical link,
wherein remote control of output power of the transmitter in the first transceiver comprises: configuring the first transceiver to be in a loopback mode;
enabling the BERT to transmit a pseudo-random (PRN) bit stream to the first transceiver, the first transceiver transmitting the PRN back to the BERT for bit error (BER) measurement, and recording of the measured BER;
the first transceiver transmitting its output power to the second transceiver; and
the second transceiver sending an output power adjustment message to the first transceiver, and the first transceiver adjusting its output power according to the output power adjustment message.

2. The method of claim 1, wherein the communication system further comprises an optical power meter.

3. The method of claim 1, wherein the first transceiver comprises a duplex small form-factor pluggable (SFP) transceiver.

4. The method of claim 1, wherein the first transceiver comprises a bidirectional small form-factor pluggable (BiDi SFP) transceiver.

5. The method of claim 1, wherein the first transceiver comprises a single wavelength bidirectional small form-factor pluggable (SWBiDi SFP) transceiver.

6. The method of claim 1, wherein the first transceiver comprises a duplex small form-factor pluggable plus (SFP+) transceiver.

7. The method of claim 1, wherein the first transceiver comprises a bidirectional small form-factor pluggable plus (BiDi SFP+) transceiver.

8. The method of claim 1, wherein the first transceiver comprises a single wavelength bidirectional small form-factor pluggable plus (SWBiDi SFP+) transceiver.

9. The method of claim 1, wherein the first transceiver comprises a duplex 10 gigabit small form-factor pluggable (XFP) transceiver.

10. The method of claim 1, wherein the first transceiver comprises a bidirectional 10 gigabit small form-factor pluggable (BiDi XFP) transceiver.

11. The method of claim 1, wherein the first transceiver comprises a single wavelength bidirectional 10 gigabit small form-factor pluggable (SWBiDi XFP) transceiver.

12. The method of claim 1, wherein the optical link comprises an optical link without optical amplifiers.

13. The method of claim 1, wherein the optical link comprises an optically amplified optical link.

14. The method of claim 1, wherein the OAM, PP & Payload Processor comprises an application specific integrated circuit (ASIC).

15. The method of claim 1, wherein the BERT equipment comprises a test equipment measures the bit error rate (BER) of a signal.

16. The method of claim 1, wherein the OAM, PP & Payload Processor comprises an integration of a plurality of integrated circuits.

17. The method of claim 16, wherein the integration of the plurality of integrated circuits comprises of a micro-controller.

18. The method of claim 16, wherein the integration of the plurality of integrated circuits comprises of a field programmable gate array (FPGA).

19. The method of claim 16, wherein the integration of the plurality of integrated circuits comprises of a micro-controller and a field programmable gate array (FPGA).

20. A method for optimizing a communication system comprising:
  remote control of output power of a transmitter in a first transceiver in a communication system, said communication system comprising an operating system with Operation, Administration, and Maintenance (OAM) and Protocol (PP) functions, an OAM, PP & Payload Processor, a built-in-system-test (BIST) procedure executed by the OAM, PP & Payload Processor, a second transceiver, and an optical link, wherein remote control of output power of the transmitter in the first transceiver comprises:

configuring the first transceiver to be in a loopback mode;
enabling the built-in-system-test (BIST) procedure to transmit a pseudo-random (PRN) bit stream or a framed bit stream to the first transceiver, the first transceiver transmitting the PRN bit stream or the framed bit stream back for bit error rate (BER) measurement, and recording the measured BER;
the first transceiver transmitting its output power to the second transceiver; and
the second transceiver sending an output power adjustment message to the first transceiver, and the first transceiver adjusting its output power according to the output power adjustment message.

21. The method of claim 20, further comprising an optical power meter.

22. The method of claim 20, wherein the OAM, PP & Payload Processor comprises an application specific integrated circuit (ASIC).

23. The method of claim 20, wherein the OAM, PP & Payload Processor comprises an integration of a plurality of integrated circuits.

* * * * *